United States Patent
Panagas

(10) Patent No.: US 8,583,392 B2
(45) Date of Patent: Nov. 12, 2013

(54) INERTIAL MEASUREMENT UNIT CALIBRATION SYSTEM

(75) Inventor: Peter Panagas, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 12/794,581

(22) Filed: Jun. 4, 2010

(65) Prior Publication Data

US 2011/0301902 A1    Dec. 8, 2011

(51) Int. Cl.
*G01P 21/00*    (2006.01)
*G01L 25/00*    (2006.01)

(52) U.S. Cl.
USPC .............. 702/93; 702/105; 702/104; 73/1.38

(58) Field of Classification Search
USPC ........................................... 702/104; 73/1.38
See application file for complete search history.

(56) References Cited

U.S. PATENT DOCUMENTS

| | | | | |
|---|---|---|---|---|
| 4,448,377 A | * | 5/1984 | Shinkle | 248/187.1 |
| 5,421,187 A | * | 6/1995 | Morgan | 73/1.78 |
| 6,934,660 B2 | | 8/2005 | Painter et al. | |
| 7,216,055 B1 | * | 5/2007 | Horton et al. | 702/153 |
| 7,418,364 B1 | * | 8/2008 | Horton et al. | 702/153 |
| 7,467,536 B2 | * | 12/2008 | Finley et al. | 73/1.38 |
| 7,930,148 B1 | * | 4/2011 | Figaro et al. | 702/196 |
| 2003/0084704 A1 | | 5/2003 | Hanse | |
| 2004/0211238 A1 | * | 10/2004 | Hanse | 73/1.38 |
| 2007/0277586 A1 | * | 12/2007 | Kamiya | 73/1.38 |
| 2008/0223107 A1 | | 9/2008 | Stewart | |
| 2009/0013755 A1 | * | 1/2009 | Tsai et al. | 73/1.38 |
| 2009/0070058 A1 | | 3/2009 | Lin | |
| 2009/0158811 A1 | | 6/2009 | Kobayashi et al. | |
| 2011/0066392 A1 | * | 3/2011 | Judd | 702/93 |
| 2011/0066395 A1 | | 3/2011 | Judd | |

* cited by examiner

*Primary Examiner* — Sujoy Kundu
*Assistant Examiner* — Regis Betsch
(74) *Attorney, Agent, or Firm* — Van Court & Aldridge LLP

(57) ABSTRACT

An electronic device can include an inertial measurement unit (IMU) operative to monitor the movement of the electronic device. The IMU used in the device can be inaccurate due to the manufacturing process used to construct the IMU and to incorporate the IMU in the electronic device. To correct the IMU output, the electronic device in which the IMU is incorporated can be placed in a testing apparatus that moves the device to known orientations. The IMU output at the known orientations can be compared to an expected true IMU output, and correction factors (e.g., sensitivity and offset matrices) can be calculated. The correction factors can be stored in the device, and applied to the IMU output to provide a true output. The testing apparatus can include a fixture placed in a gimbal movable around three axes.

7 Claims, 9 Drawing Sheets

$$\begin{pmatrix} G_x \\ G_y \\ G_z \end{pmatrix} = \begin{pmatrix} S_{xX} & S_{xY} & S_{xZ} \\ S_{yX} & S_{yY} & S_{yZ} \\ S_{zX} & S_{zY} & S_{zZ} \end{pmatrix} \cdot \begin{pmatrix} w_X \\ w_Y \\ w_Z \end{pmatrix} + \begin{pmatrix} O_x \\ O_y \\ O_z \end{pmatrix}$$

FIG. 3

$$\begin{pmatrix} w_X \\ w_Y \\ w_Z \end{pmatrix} = \begin{pmatrix} S_{xX} & S_{xY} & S_{xZ} \\ S_{yX} & S_{yY} & S_{yZ} \\ S_{zX} & S_{zY} & S_{zZ} \end{pmatrix}^{-1} \cdot \begin{pmatrix} G_x - O_x \\ G_y - O_y \\ G_z - O_z \end{pmatrix}$$

FIG. 4

INERTIAL MEASUREMENT UNIT CALIBRATION SYSTEM

BACKGROUND OF THE INVENTION

This is directed to calibrating a motion sensor array. In particular, this is directed to calibrating a three-axis motion sensor in an electronic device.

Electronic devices can include several interfaces or mechanisms for a user to provide inputs to the devices. For example, devices can include one or more buttons, keys, switches, or other physical interfaces. As another example, devices can include one or more touch sensitive surfaces (e.g., a touch pad or a touch screen) by which a user can provide inputs. As still another example, devices can include one or more sensors that can capture information about the environment of a device or the position of the device in the environment. Such sensors can include, for example, a proximity sensor, an ambient light sensor, an infrared sensor, a multi-axis motion sensor (e.g., an inertial measurement unit such as a gyroscope or accelerometer), or combinations of these.

In some embodiments, the output of one or more sensors can be used by an application or device process. For example, the output of an ambient light sensor or of a proximity sensor can be used to turn on or off a display. As another example, the output of an inertial measurement unit can be used to control the orientation of displayed information (e.g., portrait or landscape). As still another example, the output of an inertial measurement unit can be used to control the movement of information provided on a display (e.g., to control a game). As still yet another embodiment, the output of an inertial measurement unit can be used to correct the error in the output of another sensor (e.g., to correct the output of a compass).

The output of an inertial measurement unit, however, may not be oriented in a manner that matches a reference frame of a device in which the inertial measurement unit is placed. In particular, each of three individual sensors can be offset relative one another, and the combined sensors forming the inertial measurement unit can be offset relative to the device axes when the inertial measurement unit is placed within the device. The offset can cause the output of the inertial measurement unit to be inaccurate and adversely affect the operation of one or more device processes or applications.

SUMMARY OF THE INVENTION

This is directed to calibrating an inertial measurement unit (IMU) incorporated in an electronic device once the device has been assembled. In particular, this is directed to correcting the reference frame of the IMU output to match the electronic device reference frame.

An electronic device can include a commercial IMU that has limited accuracy. In particular, the IMU can be constructed such that the reference frame of the IMU is not perfectly orthogonal. In some applications, however, the electronic device can require a more accurate IMU output. To ensure that the IMU output corresponds to the device reference frame, the device can be placed in a testing apparatus and calibrated.

The testing apparatus can include a fixture having several slots for receiving electronic devices. The slots can be substantially parallel such that each device placed in the slots is in substantially the same reference frame. Each electronic device can be retained in a slot by a rubber extension that contacts the devices when the fixture is closed (e.g., when a lid is placed over the devices). In some embodiments, the fixture can include a more precise IMU aligned with the slots in the fixture to provide a real-time accurate or true IMU output when the fixture moves.

The testing apparatus can move through a series of testing positions. For example, the testing apparatus can move through at least four uncorrelated testing orientations. As another example, the testing apparatus can move through any suitable number of testing positions, including a first number for calibration and a second number for testing (e.g., at least four for determining a correction factor and fifty for confirming that the correction factor is correct). The testing apparatus can capture an IMU output at each of the testing orientations, where the IMU output corresponds to a reference frame of the IMU. Because the testing orientations are known, the testing apparatus can also know what the IMU output would be in an electronic device reference frame. Using a sufficient number of testing positions, the testing apparatus can generate several equations to solve for a correction factor converting the IMU output to an electronic device reference frame.

The correction factor can take any suitable form. For example, the correction factor can include a scalar term and an additive constant. In some embodiments, the scalar term can be expressed as a multiplicative sensitivity matrix (e.g., a 3×3 matrix). The additive constant can be expressed as an offset matrix (e.g., a 1×3 matrix). The IMU output in the IMU reference frame can then be calculated by multiplying an IMU output in the device reference frame with the sensitivity value and adding the offset.

In some embodiments, the testing apparatus can retrieve an IMU output from more testing positions than required to solve for the correction factors (e.g., more than four positions providing equations for 12 unknowns). Using the additional data, a least square regression can be applied to equations to more accurately calculate values for the correction factor. In some embodiments, additional testing positions can be used to verify a calculation of the correction factor. For example, the correction factor can be applied to an IMU output, and compared to a known expected IMU output in the electronic device reference frame. If the correction factor provides a corrected output that is within a threshold (e.g., correct enough), the correction factor can be accepted.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 3 is an illustrative equation correlating the raw output of a multi-axis IMU with the motion of a device in which the IMU is placed in accordance with one embodiment of the invention;

FIG. 4 is an equation for determining the true movement of an electronic device from the output of an IMU in accordance with one embodiment of the invention;

DETAILED DESCRIPTION

An electronic device can include a sensor array including an inertial measurement unit (IMU). Before the electronic device is shipped, the IMU can be calibrated to ensure an accurate output.

Figure 1:
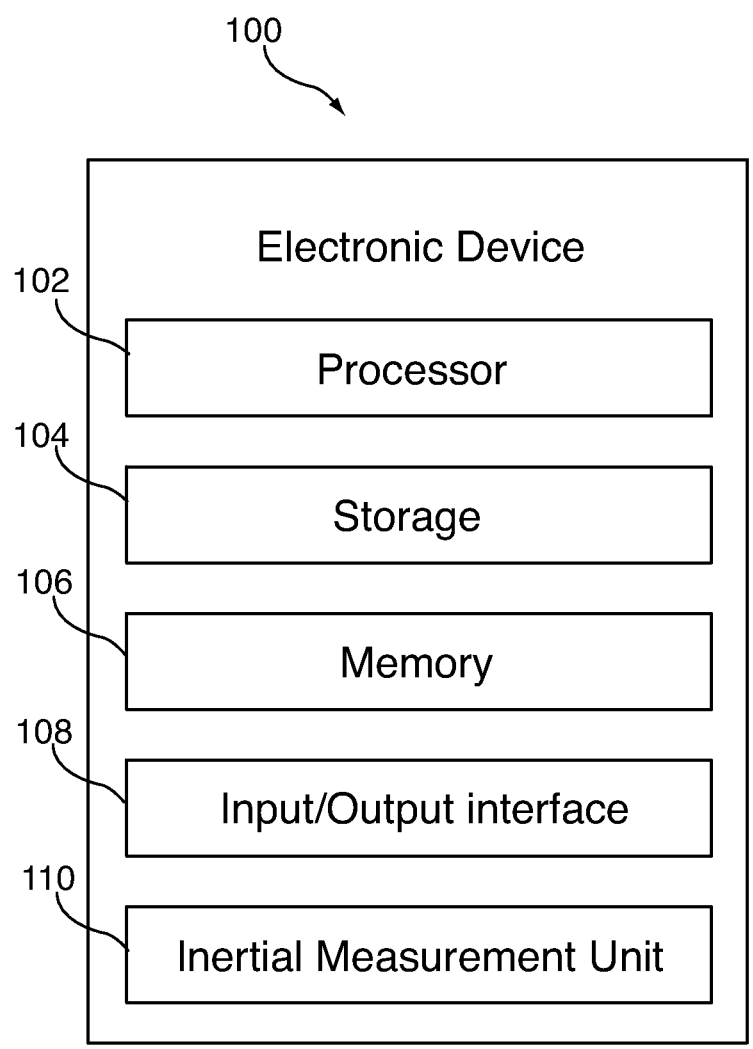
FIG. 1 is a schematic view of an illustrative electronic device having an inertial measurement unit in accordance with one embodiment of the invention.

FIG. 1 is a schematic view of an illustrative electronic device having an inertial measurement unit in accordance with one embodiment of the invention. Electronic device 100 can include any suitable type of electronic device operative to connect to a network storage system or to be used as part of a network storage system. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108, and inertial measurement unit 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., a sensor array or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data.

Input/output interface 108 can convert (and encode/decode, if necessary) analog signals and other signals into digital data. For example, input/output interface 108 may receive and convert physical contact inputs (e.g., from a multi-touch screen or a button press), physical movements (e.g., from a mouse or sensor), analog audio signals (e.g., from a microphone), or any other input provided by a user. Although input/output interface 108 is illustrated in FIG. 1 as a single component of electronic device 100, several instances of input/output interface 108 can be included in electronic device 100.

Electronic device 100 can include any suitable mechanism, circuitry or component for allowing a user to provide inputs to input/output interface 108. For example, electronic device 100 may include a button, keypad, dial, a click wheel, or a touch interface (e.g., a capacitive touch screen), or combination of these. In some embodiments, input/output information 108 can instead or in addition include circuitry, software, firmware, or other components for detecting and processing voice inputs or other audio inputs. In some cases, input/output interface 108 can be operative to detect and process inputs received from gestures of the device (e.g., inputs detected from movements of the device, such as shaking, twisting or spinning).

Electronic device 100 can include specialized output interface associated with output signals such as, for example, one or more audio or visual outputs. An audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 100, a movable display or a projecting system for providing a display of content on a surface remote from electronic device 100 (e.g., a video projector), or combinations of these. In some embodiments, input/output interface 108 can include a coder/decoder (Codec) to convert digital media data into analog signals such as, for example, video Codecs, audio Codecs, or any other suitable type of Codec.

Inertial measurement unit 110 (IMU 110) can be operative to detect movements of electronic device 100. In some embodiments, an IMU can include one or more three-axes acceleration motion sensors (e.g., an accelerometer) operative to detect linear acceleration in three directions (i.e., the x or left/right direction, the y or up/down direction, and the z or forward/backward direction). As another example, an IMU can include one or more two-axis acceleration motion sensors which can be operative to detect linear acceleration only along each of x or left/right and y or up/down directions (or any other pair of directions). In some embodiments, an IMU can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable digital accelerometer.

In some embodiments, the IMU can directly detect rotation, rotational movement, angular displacement, tilt, position, orientation, motion along a non-linear (e.g., arcuate) path, or any other non-linear motions. For example, if the IMU is a linear motion sensor, additional processing can be used to indirectly detect some or all of the non-linear motions.

For example, by comparing the linear output of the motion sensor with a gravity vector (i.e., a static acceleration), the motion sensor can calculate the tilt of electronic device 100 with respect to the y-axis. In some embodiments, the motion sensor can instead or in addition include one or more gyromotion sensors or gyroscopes for detecting rotational movement. For example, IMU 110 can include a rotating or vibrating element.

Figure 2:
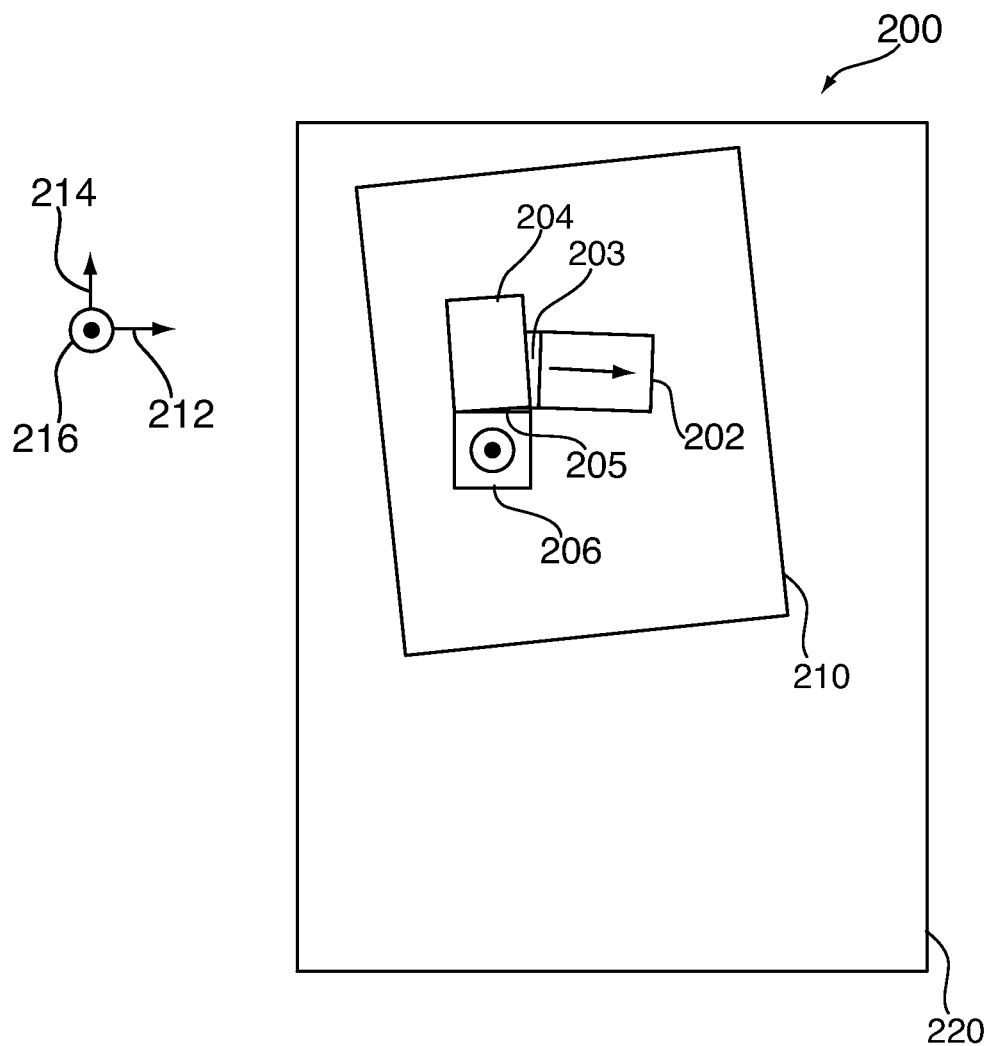
FIG. 2 is a schematic view of an illustrative three-axis IMU.

FIG. 2 is a schematic view of an illustrative three-axis IMU. IMU 200 can include single axis sensors 202, 204 and 206 positioned substantially in orthogonal directions 212, 214 and 216 (e.g., corresponding to a reference frame of device 220). Each individual sensor can be coupled to the other sensors using adhesive layers 203 and 205, or any other manufacturing process (e.g., build the sensors simultaneously on a single component). Because the adhesive layers may not be uniform, or may dry in an uneven manner, or there may be other manufacturing defects, the individual sensors can be misaligned relative to orthogonal directions 212, 214 and 216. In particular, the reference frame defined by the axes of sensors 202, 204 and 206 can be offset from the reference frame defined by directions 212, 214 and 216. When an electronic device application or process then receives an output from one of sensors 202, 204 and 206, the application or process may incorrectly assume that the output corresponds to the reference frame of directions 212, 214 and 216, which can cause an error in the output of the application or process.

Sensors 202, 204 and 206 can be combined and placed in package 210, which can be provided to a device manufacturer. The sensors can be placed in package 210 in any suitable manner, including such that the axes of sensors 202, 204 and 206 substantially match axes defining the orientation of package 210. In some embodiments, the reference frame of package 210 can be offset from the reference frame of sensors 202, 204 and 206 due to manufacturing artifacts. This can cause an additional error in the output of IMU 200. Finally, package 210 can be placed in electronic device 220 such that the orientation of the package substantially matches the orientation of the device. Because of manufacturing artifacts, however, the package and device orientations can be offset.

The successive offsets in the attachment of IMU 200 can change the true reference frame of the IMU relative to the actual reference frame of the device in which the IMU is installed. In particular, the change in reference frame can be quantified, for each device, as an offset and a sensitivity factor. The offset can be defined as a constant additive error to all measurements (e.g., along all axes of the device). The sensitivity factor can be defined as a multiplicative factor. When applied to a three-dimensional IMU (e.g., a three axis accelerometer or gyroscope), the offset can be defined as a three element vector, and the sensitivity factor can be defined as a three by three matrix. FIG. 3 is an illustrative equation correlating the raw output of a multi-axis IMU with the motion of a device in which the IMU is placed in accordance with one embodiment of the invention. Equation 300 can include raw IMU output 310, which equals sensitivity factor 330 multiplied by true movement 320 (e.g., in the device reference frame) plus bias or offset 340. Output 310 can be defined as a vector having three values, one for each of the three sensors in the IMU. For example, the three values can correspond to linear acceleration in the x, y and z directions of the IMU. As another example, the three values can correspond to angular velocity around the x, y and z axes of the IMU. True movement 320 can include a three part vector having corresponding linear acceleration or angular velocity in the reference frame of the device.

Sensitivity factor 330 can include a matrix having as many rows as elements in IMU output 310, and as many columns as elements in true movement 320. In particular, each term in sensitivity factor 330 can correspond to a scalar factor for transforming the reference frame of the sensors forming an IMU with the reference frame of the device. Bias or offset 340 can include as many elements as true movement 320.

To determine values for sensitivity factor 330 and bias 340, an electronic device can be placed in a testing fixture in which both IMU output 310 and true movement 320 can be known. Using several measurements, a solution can be found for both sensitivity factor 330 and offset 340. More specifically, sensitivity factor 330 can include 9 unknowns, while offset 340 can include 3 unknowns. Using 4 distinct measurements, a user can provide 12 distinct equations for the 12 unknowns. Using scalar mathematics, the equations can be solved for sensitivity factor 330 and offset 340.

FIG. 4 is an equation for determining the true movement of an electronic device from the output of an IMU in accordance with one embodiment of the invention. True movement 420 can be defined as the scalar multiplication of inverse 430 of sensitivity factor 330 with the difference of IMU output 410 and offset 440 (which can be the same as offset 340). The electronic device can apply equation 400 to the output of an IMU to ensure that the IMU values used by electronic device applications and processes correspond to an output in the device reference frame.

Figure 5A:
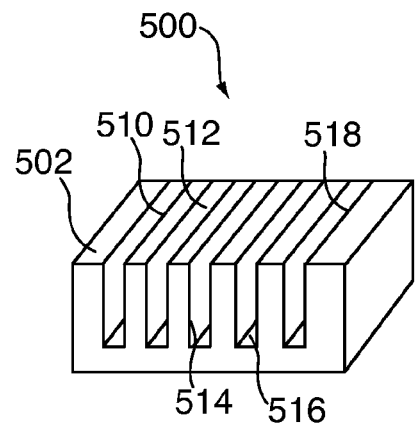
FIG. 5A is a schematic top view of an illustrative testing fixture in accordance with one embodiment of the invention.
Figure 5B:
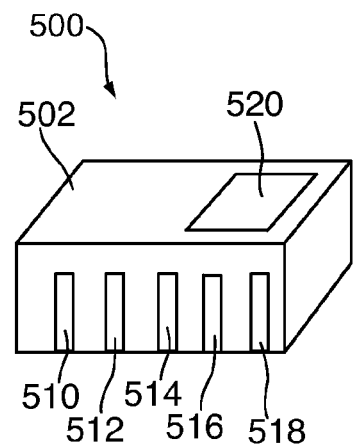
FIG. 5B is a schematic bottom view of an illustrative testing fixture in accordance with one embodiment of the invention.

In some embodiments, a testing apparatus can be used to calculate the sensitivity factor and offset for each device, and to apply the sensitivity factor and offset to an IMU output to calibrate the IMU once it has been installed in the device. The testing apparatus can hold one or more devices in several different known orientations. The testing apparatus can include an IMU calibrated and aligned with the testing apparatus such that the testing apparatus IMU has the same reference frame as devices placed in the testing apparatus. FIG. 5A is a schematic top view of an illustrative testing fixture in accordance with one embodiment of the invention. FIG. 5B is a schematic bottom view of an illustrative testing fixture in accordance with one embodiment of the invention. Fixture 500 can include body 502 having slots 510, 512, 514, 516 and 518 for receiving individual electronic devices in the fixture. Body 500 can be constructed from any suitable material, including for example a composite material, plastic (e.g., a polyetherimide, polyether ether ketone, or another thermoplastic), a metal, or combinations of these. In some embodiments, the material for fixture 500 can be selected to be quickly, easily and accurately manufactured into body 502. For example, the material can be selected from materials that can be quickly cut with high tolerances to form the slots in a single block (e.g., reducing alignment errors due to assembling several components together to form the fixture). In addition, the material can be selected for resistance to warping. By constructing body 502 from a single piece of material, it can be easier to ensure that all of the slots in the body are aligned in the same reference frame. In addition, it can be easier to ensure that an IMU integrated in the body is aligned in the same reference frame as the slots.

Body 502 can have any suitable shape. For example, body 502 can include a substantially box-like shape. In some embodiments, body 502 can include one or more protrusions, edges, chamfers, hooks, or other features for engaging body 502 with a testing apparatus (e.g., with a gimbal). In some embodiments, body 502 can include an extension (e.g., a plate) having a hole in an end of the extension, where the extension is operative to be received on a shelf of the testing apparatus, and a pole or arm from the gimbal is operative to extend into the hole to secure the fixture in the apparatus.

In some embodiments, body 502 can include reference IMU 520 oriented to substantially match the orientation of body 502. For example, IMU 520 can include a three-axis sensor for which the three axes are aligned with reference points of body 502. In some embodiments, body 502 can include alignment points, reference lines or features, or any other feature for ensuring a proper alignment of IMU 520 in the body. For example, a lower or bottom surface of body 502 can include an opening for receiving IMU 520, where the opening is substantially the same shape as IMU 520. In some embodiments, a lower surface of body 502 can be partially hollow to receive IMU 520, other fixture or measuring components, wires or connectors, or combinations of these. Reference IMU 520 can be a very or more accurate IMU (e.g., an IMU constructed for research or scientific purposes) for which the individual sensors are carefully aligned along a known reference (e.g., a reference shown on an enclosure of IMU 520), in contrast with more affordable, but less accurately constructed IMUs installed in an electronic device (e.g., commercial IMUs available for use in consumer electronic devices).

Body 502 can include any suitable number of slots for receiving devices. For example, body 502 can include a number in the range of 2 to 200 slots (e.g., based on the size of the device being calibrated). In some embodiments, the number of slots can be selected based on a maximal weight of fixture 500. For example, the maximal weight can be selected based on the expected strength of a worker installing fixture 500 in the testing apparatus. The slots can be distributed in body 502 using any suitable approach. In some embodiments, the slots can be distributed in a symmetrical manner so that the fixture remains balanced independent of the number of devices mounted in the fixture. For example, the fixture can have an odd number of slots, so that if an odd number of devices are calibrated, devices can be placed in the center slot and as pairs around the center slot, and if an even number of devices are calibrated, devices can be placed in pairs around the center slot. If the fixture has an even number of slots, a dummy device having the same size and weight as the tested devices can be used to provide a symmetrical device configuration when an odd number of devices are tested.

Figure 6A:
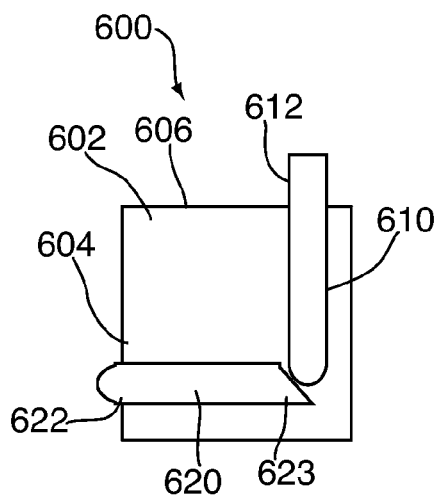
FIGS. 6A and 6B are different configurations of a retention mechanism in accordance with one embodiment of the invention.
Figure 6B:
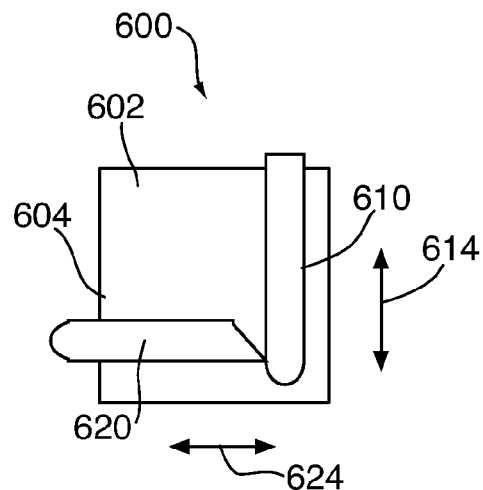

An electronic device can be retained in a slot using any suitable approach. In some embodiments, a mechanical retention mechanism can be used. FIGS. 6A and 6B are different configurations of a retention mechanism in accordance with one embodiment of the invention. Body 602 can include slot wall 604, forming part of a slot operative to receive an electronic device in a fixture (e.g., fixture 500, FIG. 5), and top wall 606 over which a cover can be placed to retain the electronic devices. Mechanism 600 can include arms or pins 610 and 620 offset and oriented such that a displacement in pin 610 causes a displacement in pin 620. In particular, pins 610 and 620 can be positioned such that a vertical displacement of pin 610 causes a horizontal displacement of pin 620 (e.g., when one end of pin 610 comes into contact with one end of pin 620). Pin 610 can be retained in slot 612 of body 602, which can be substantially vertical. One end of slot 612 can be open to a surface of body 602 (e.g., an opening in top wall 606). Slot 612 can include a spring or other deflection mechanism to bias pin 610 in a particular position. For example, pin 610 can be biased to extend partially out of body 602. Pin 610 can have any suitable shape. In some embodiments, pin 610 can include a substantially straight pin having rounded ends (e.g., to ensure that the pin does not catch on another component). Each pin can include one or more features for controlling or defining the travel of each pin within body 602.

Pin 620 can be retained in slot 622 of body 602, one end of which can extend through a surface of the body (e.g., through slot wall 604). Slot 622 can have any suitable orientation in the body. In some embodiments, the orientation of slot 622 can be selected relative to the orientation of slot 612. For example, slots 612 and 622 can be substantially perpendicular. In some embodiments, slots 612 and 622 can intersect or connect to allow pins 610 and 620 to interact. For example, pin 620 can include angled end 623 positioned at or near the intersection of slots 612 and 622. The angled end can be oriented such that when pin 610 is deflected in direction 614 (e.g., pushed into the body by a cover), the end of pin 610 can contact angled end 623 and deflect pin 620 out of slot wall 604 in direction 624. When an electronic device is placed in the slot, pin 620 can extend to hold the electronic device in place. Body 602 can include any suitable number of mechanisms for retaining an electronic device. In some embodiments, body 602 can include one, two or more mechanisms per slot wall (e.g., two or four per slot).

Figure 7:
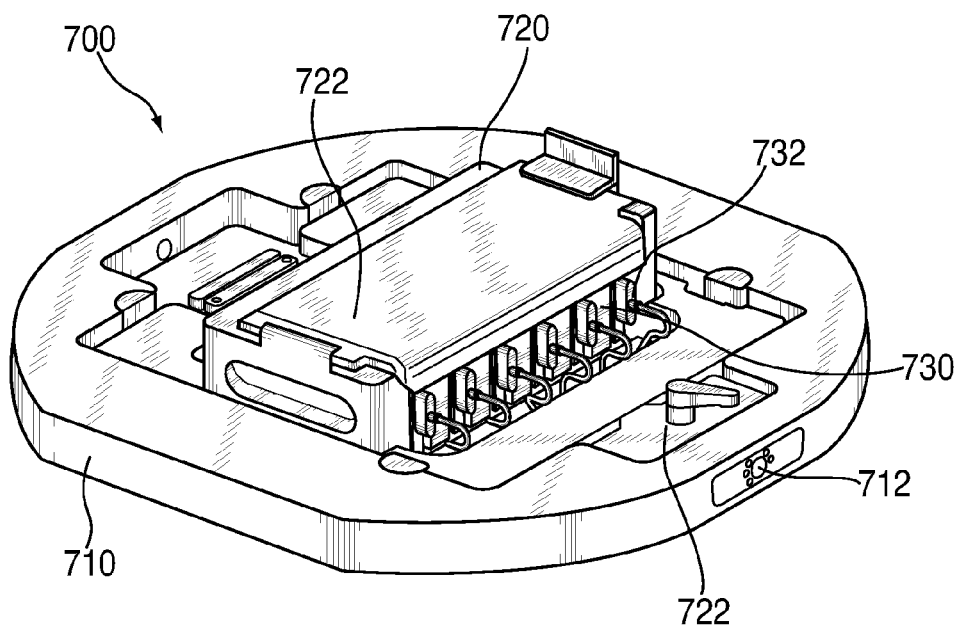
FIG. 7 is a schematic view of an illustrative testing apparatus in accordance with one embodiment of the invention.

The fixture can be placed in a testing apparatus to calibrate the one or more IMUs of a device. For example, one or more devices can be placed in the fixture and retained by mechanism 600 (FIG. 5), and the fixture installed in a gimbal apparatus operative to orient the devices in several known orientations to receive a corresponding IMU outputs. FIG. 7 is a schematic view of an illustrative testing apparatus in accordance with one embodiment of the invention. Apparatus 700 can include inner plate 710 of a gimbal in which fixture 720 can be secured. In some embodiment, fixture 720 can include some or all of the features of fixture 500 (FIG. 5), and can be used to retain electronic devices 730 (e.g., using cover 722 placed over slots in the fixture). Each device can be connected to a processing system or computer (e.g., control circuitry) via connectors 732. In some embodiments, the processing system can control the movement of the gimbal, retrieve information from the devices, or provide information to the devices. The processing circuitry can be connected to the gimbal, devices, or both using any suitable approach, including for example using a wired or wireless communications path.

Fixture 720 can be retained within inner plate 710 using any suitable approach. In some embodiments, inner plate 710 can include securing mechanism 722 for retaining fixture 720. The securing mechanism can include a latch or handle for selectively securing the fixture to the inner plate. For example, an operator can actuate the handle to open the testing apparatus and insert a fixture in the inner plate. Once the fixture has been inserted, the operator can actuate the handle and secure or lock the fixture within the inner plate.

Inner plate 710 can be incorporated in a testing apparatus operative to rotate inner plate 710 along three axes. For example, the testing apparatus can place the gimbal at particular angles relative to an orientation defined by a reference coordinate system. In particular, inner plate 710 can include connection interface 712 around which inner plate 710 can rotate. For example, connection interface 712 can include an opening into which an axis can extend to allow the inner plate to rotate. In some embodiments, the inner plate can be placed in a moving or rotating testing apparatus, such that the testing apparatus can move around axes that are different than the inner plate axis (e.g., the axis provided by connection interface 712).

In some embodiments, the position of each slot in the fixture can be subject to slight variations in IMU output. For example, as the fixture rotates about an axis, the centrifugal force applied to each slot can be different. As another example, the acceleration due to gravity can vary slightly based on the height of each slot relative to the testing apparatus. Accordingly, there may be a sensitivity and offset corresponding specifically to each slot relative to the IMU in the fixture (e.g., IMU 520, FIG. 5). To calibrate the fixture and testing apparatus, a highly accurate IMU can be incorporated in a box or enclosure matching the size and weight distribution of an electronic device. The position of the accurate IMU can be set to match the reference frame of the enclosure (and thus the reference frame of an electronic device calibrated using the testing apparatus). Using the accurate IMU, the testing apparatus can determine the difference in measured movement between the fixture IMU and the actual movement associated with each slot as the testing apparatus moves the fixture through each of the testing positions, and calculate the sensitivity and offset defining the difference in reference frame between the slot and the fixture IMU. The slot-specific sensitivity and offset can be added to the sensitivity and offset calculated for each device tested by the testing apparatus.

To calibrate an IMU once it is in the device, the device can be placed in the fixture, and the fixture in the testing apparatus. The testing apparatus can then be successively placed in different positions and rotated along a particular axis at a known speed. The IMUs of a device can provide an output corresponding to the movement of the device within the testing apparatus. The testing apparatus can use any suitable testing positions for the electronic devices. For example, the testing apparatus can position the devices in a sequence of x-y positions (e.g., angles relative to an x-axis and to a y-axis), and rotate the devices around a z-axis. In one implementation, the testing apparatus can move the devices to a series of uncorrelated positions. For example, the uncorrelated positions can include positions in the range of x=[−180, 180] and y=[−180, 180]. Once the testing apparatus reaches a testing position, the apparatus can rotate about an axis (e.g., a z-axis) at one or more constant or varying speeds, including an 0-velocity. As the apparatus rotates, the testing apparatus can capture data from the IMUs of tested devices. The testing apparatus can capture IMU outputs at any suitable frequency and for any suitable duration. For example, the IMU outputs can be captured at 100 Hz during one second.

Figure 8:
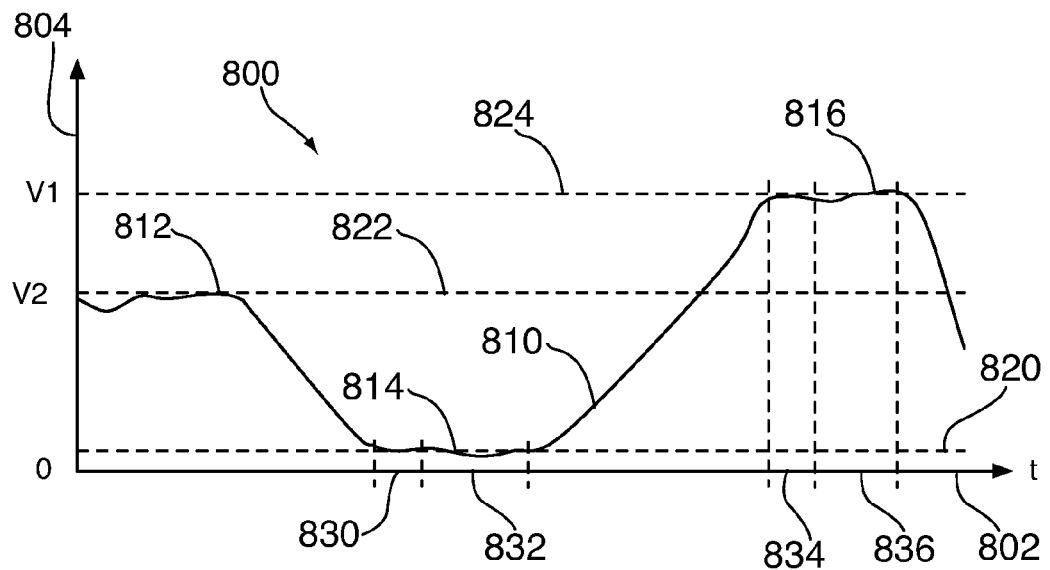
FIG. 8 is a chart of testing apparatus velocity over time in accordance with one embodiment of the invention.

The testing apparatus can process the captured outputs using any suitable approach. In some embodiments, the testing apparatus can apply a filter, an average, or other processing to extract one or more values for the IMU in a particular testing configuration or orientation. The one or more values can then be used to determine the sensitivity factor and offset using equation 400. FIG. 8 is a chart of testing apparatus velocity over time in accordance with one embodiment of the invention. In particular, chart 800 can represent the angular velocity of a device in the fixture around the z-axis as the testing apparatus moves. Chart 800 can include time axis 802 and velocity axis 804. Testing apparatus velocity curve 810 can vary between constant testing velocities 822 and 824, and 0 velocity 820. In particular, the testing apparatus can start in an initial position or orientation during curve region 812, move to a second position or orientation during curve region 814, and then move again at a non-0 velocity in the second position or orientation.

To determine an accurate sensor output for a particular testing apparatus orientation or position, the testing apparatus can monitor the current velocity of the testing apparatus, and wait for a minimum delay before starting to capture data. This can ensure that the sensors are not capturing an output corresponding to a transitioning velocity or corresponding to a transitioning orientation (e.g., as the testing apparatus moves between two testing orientations). For example, the testing apparatus can let time periods 830 and 834 lapse before capturing the output of an IMU during time periods 832 and 836 corresponding to velocities 0 and V1. Time periods 830 and 834, and periods 832 and 836 can have any suitable duration. In some embodiments, the time periods can be selected to ensure that sufficient IMU outputs can be retrieved, while minimizing the time required to process each device. In particular, the time periods can be selected to maximize the number of units per hour that are calibrated after manufacturing. In some embodiments, time periods can be adjusted or monitored to ensure that noise from the manufacturing environment does not adversely affect the calibration of the IMUs.

Figure 9:
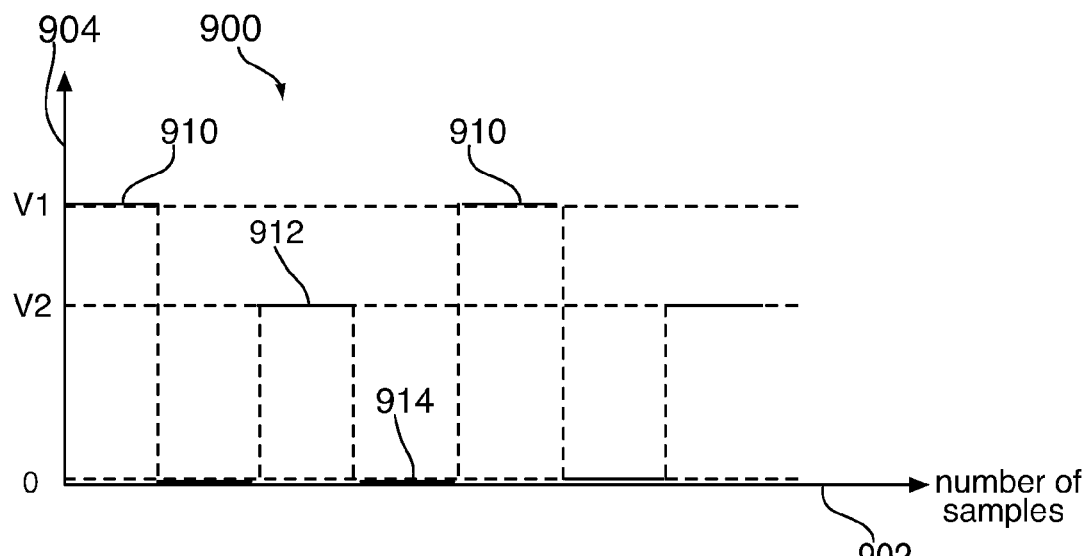
FIG. 9 is a schematic view of the number of IMU output samples captured at each velocity.

FIG. 9 is a schematic view of the number of IMU output samples captured at each velocity. Chart 900 can include number of samples axis 902 and velocity axis 904. Using the testing apparatus, IMU outputs can be gathered at each of velocities V2, V1 and 0. In particular, as the testing apparatus reaches a constant velocity, the testing apparatus can gather IMU output samples 910, 912 and 914 (e.g., each corresponding to velocities V1, V2 and 0, respectively). The particular distribution of velocities along chart 900 can correspond to the manner in which the testing apparatus moves during calibration. In particular, the samples can be captured at a non-0 velocity, then at a 0-velocity while the device in the fixture moves to a new orientation or configuration. In some embodiments, however, the testing apparatus may not capture any data at 0-velocity while the device configuration changes. For example, the testing apparatus may not capture any IMU output data while the device configuration changes, as the testing apparatus may not know the manner or speed at which the orientation changes.

By capturing and processing data at a sequence of known orientations, and with known movement around the orientations, the testing apparatus can know the actual or true movement of the tested devices. For example, the testing apparatus can know, from an accurate IMU incorporated in an enclosure matching a device size (e.g., as described above), the true or more accurate IMU output for each slot in the fixture. The testing apparatus can also receive, from each device, the output along each IMU axis of the IMU within the device. Using six distinct orientations, the testing apparatus can retrieve 18 equations for the 12 unknowns (9 unknowns for the sensitivity matrix and 3 for the offset matrix), thus defining an over-specified set of equations. Any suitable number of orientations can be used, including more than the minimum required to solve the equations to ensure accuracy. For example, 4, 5, 6, 7 or more orientations can be used, though 5 or 6 orientations may provide the most accurate sensitivity and offset values while maximizing the number of devices calibrated per hour. The testing apparatus can solve for the unknowns using a least square regression to most accurately determine the sensitivity and offset for each device. The determined sensitivity and offset can be stored in a memory of each device (e.g., in non-volatile memory such as NAND), such that the sensitivity and offset can be applied to all device IMU outputs to provide the true movement in the reference frame of the device (e.g., using equation 400, FIG. 4).

In some embodiments, the testing apparatus can verify the accuracy of the determined sensitivity and offset. For example, the testing apparatus can capture IMU data from other orientations in addition to the initial testing orientations. The testing apparatus can select any suitable additional orientations. For example, the testing apparatus can use an additional three orientations for verification. The additional orientations can be selected to be uncorrelated from one another, and uncorrelated from the initial orientations used to identify the IMU correction factors. For example, the additional orientations can include [0, 90], [90, 0], and [45, 32.5], defined as x-y angle pairs. The testing apparatus can compare the result of equation 400 as applied to the IMU output with the known true movement of the electronic device during the test. If the testing apparatus determines that the calculated device movement is within a particular threshold (e.g., less than a maximum error), the device can be accepted.

Figure 10:
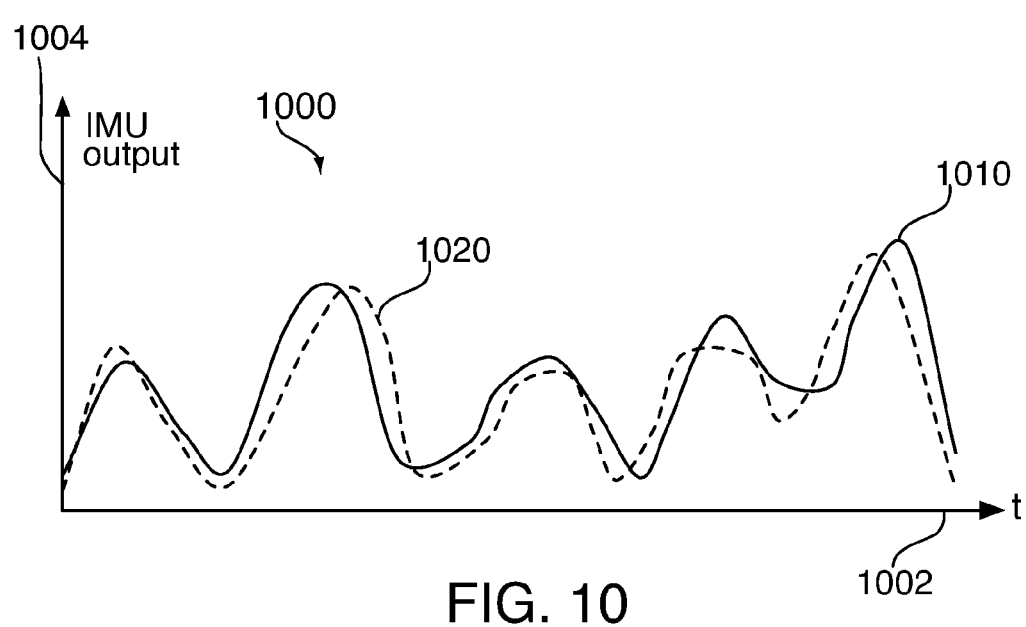
FIG. 10 is a chart of a IMU output over time as the fixture is moved between testing positions in accordance with one embodiment of the invention.

In some embodiments, the time required for calibrating an IMU in a device can be reduced by using the IMU signal as the fixture moves (e.g., between testing or calibration orientations or positions). For example, the testing apparatus can include an embedded sensor (e.g., an embedded IMU) aligned with the fixture (e.g., with slots within the fixture). FIG. 10 is a chart of a IMU output over time as the fixture is moved between testing positions in accordance with one embodiment of the invention. Chart 1000 can include curve 1010 corresponding to the output of an IMU in a device, and curve 1020 corresponding to the output of the testing apparatus IMU. As the fixture moves the device between different configurations, both the device IMU and testing apparatus IMU can provide outputs. If the testing apparatus can synchronize the outputs, the testing apparatus can correlate the device-measured IMU and the true testing apparatus IMU output as the testing apparatus moves. The testing apparatus can then solve for the sensitivity and offset matrices using outputs around or between the testing positions. This can allow calibration at times other than when an x-y position matches a predefined testing position or orientation (e.g., time periods other than periods 832 and 836 in chart 800, FIG. 8), and therefore decrease the time required from calibrating devices using the testing apparatus.

Figure 11:
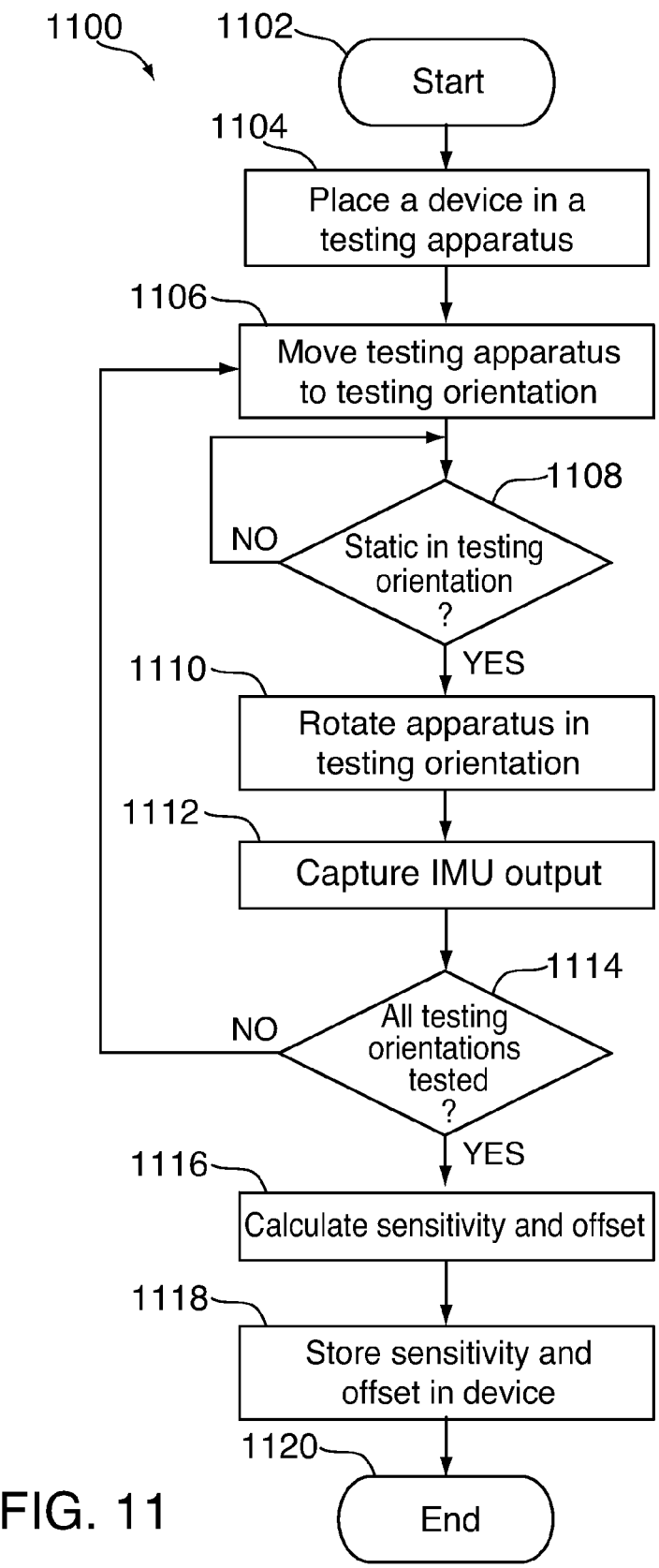
FIG. 11 is a flowchart of an illustrative process for calibrating an IMU placed in a device in accordance with one embodiment of the invention.

FIG. 11 is a flowchart of an illustrative process for calibrating an IMU placed in a device in accordance with one embodiment of the invention. Process 1100 can begin at step 1102. At step 1104, an assembled electronic device having an IMU can be placed in a testing apparatus. For example, an electronic device can be placed in a fixture connected to a gimbal operative to rotate along three axes. At step 1106, the testing apparatus can move to place the device in the apparatus in a testing orientation or configuration. For example, the testing apparatus can rotate along one, two or three axes to reach a testing orientation. In some cases, the testing apparatus can move between several testing orientations (e.g., a number of orientations in the range of one to 15, for example, 4 to 7 testing orientations). At step 1108, the testing apparatus can determine whether it has reached a testing orientation. For example, the testing apparatus can determine whether movement around two axes (e.g., around x and y axes) has finished.

If the testing apparatus determines that a testing orientation has not been reached, process 1100 can return to step 1108 and continue to monitor for reaching the testing orientation. If, at step 1108, the testing apparatus instead determines that the testing apparatus has been reached, process 1100 can move to step 1110. At step 1110, the testing apparatus can rotate the device along one or more axes in a known manner. For example, the testing apparatus can rotate the device around a z-axis at one or more constant velocities. At step 1112, the testing apparatus can capture an IMU output of the device. For example, the testing apparatus can capture an IMU output as the testing apparatus causes the devices to rotate, and process the output to extract specific data. The testing apparatus can, for example, extract an output corresponding to each of three different axes of the IMU. The testing apparatus can capture data at any suitable rate and for any suitable duration, including for example at a rate in the range of 25 to 500 Hz (e.g., 50 Hz), and for a duration in the range of 0.2 to 5 seconds (e.g., 2 20 seconds). In some embodiments, the testing apparatus can capture data at a variable rate (e.g., capture more data when the apparatus is in a testing orientation, and less data when the apparatus is moving into a testing orientation).

At step 1114, the testing apparatus can determine whether all testing orientations have been tested. For example, the testing apparatus can determine whether a set or sequence of testing orientations have been reached by the testing apparatus. The testing apparatus can run through any suitable number of orientations, including for example at least four, or less than fifty. At step 1116, the testing apparatus can calculate sensitivity and offset matrices for each device. For example, the testing apparatus can solve for the sensitivity and offset using linear algebra. If the testing apparatus uses an overdefined data set (e.g., IMU data from six testing orientations), the testing algorithm can use a least square regression. At step 1118, the testing apparatus can store the calculated sensitivity and offset in the electronic device. For example, the electronic device can store the sensitivity and offset in non-volatile memory that can be accessed when the device requests a IMU output. Process 1100 can end at step 1120.

Figure 12:
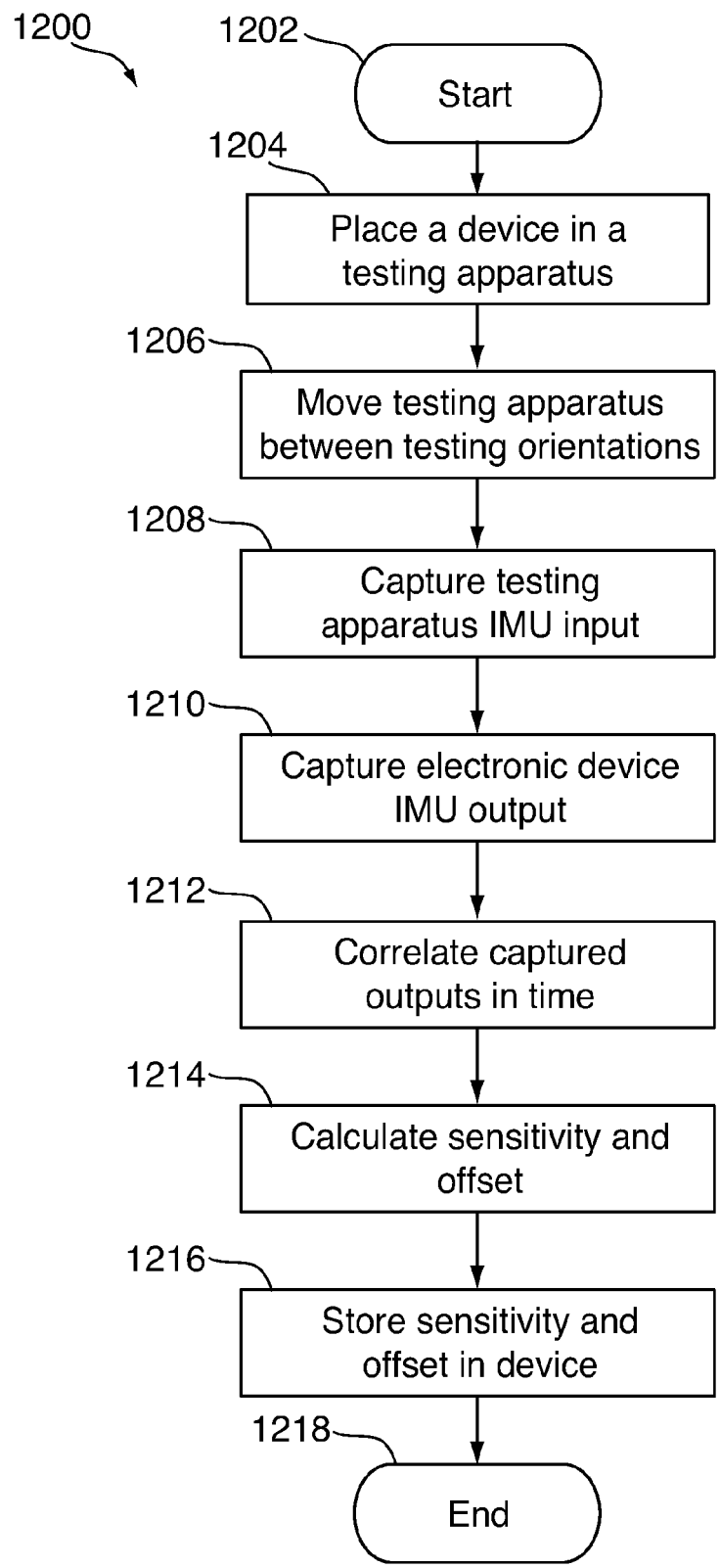
FIG. 12 is a flowchart of an illustrative process for dynamically determining a bias and offset corresponding to an IMU in an electronic device in accordance with one embodiment of the invention.

FIG. 12 is a flowchart of an illustrative process for dynamically determining a bias and offset corresponding to an IMU in an electronic device in accordance with one embodiment of the invention. Process 1200 can begin at step 1202. At step 1204, an assembled electronic device having an IMU can be placed in a testing apparatus. For example, an electronic device can be placed in a fixture connected to a gimbal operative to rotate along three axes. In some cases, several devices can simultaneously be placed in the testing apparatus. At step 1206, the testing apparatus can move to place the device in the apparatus in a testing orientation or configuration. For example, the testing apparatus can rotate along one, two or three axes to reach a testing orientation. In some cases, the testing apparatus can move between several testing orientations (e.g., a number of orientations in the range of one to 15, for example, 4 to 7 testing orientations).

At step 1208, the electronic device can capture the output of an IMU incorporated in the testing apparatus. For example, the electronic device can capture the output of an accurate IMU placed in the reference frame of slots of the testing apparatus. At step 1210, the testing apparatus can capture an IMU output of the device. For example, the testing apparatus can capture an IMU output as the testing apparatus causes the devices to rotate, and process the output to extract specific data. The testing apparatus can, for example, extract an output corresponding to each of three different axes of the IMU. The testing apparatus can capture data from the testing apparatus IMU and the device IMU at any suitable rate and for any suitable duration, including for example at a rate in the range of 50 to 200 Hz (e.g., 100 Hz), and for a duration in the range of 0.2 to 2 seconds (e.g., 1 second). In some embodiments, the testing apparatus can capture data at a variable rate (e.g., capture more data when the apparatus is in a testing orientation, and less data when the apparatus is moving into a testing orientation.

At step 1212, the testing apparatus can correlate the capture IMU outputs in time. For example, the testing apparatus can identify the specific device IMU output that corresponds to each specific testing apparatus IMU output. In particular, the testing apparatus can use a precise clock or timing mechanism for correlating the captured outputs. At step 1214, the testing apparatus can calculate sensitivity and offset matrices for each device. For example, the testing apparatus can solve for the sensitivity and offset using linear algebra. If the testing apparatus uses an over-defined data set (e.g., IMU data from six testing orientations), the testing algorithm can use a least square regression. In some embodiments, the testing apparatus can incorporate a previously calculated and known sensitivity and offset associated with the position of the device in the testing apparatus to the calculated device sensitivity and offset. At step 1216, the testing apparatus can store the calculated sensitivity and offset in the electronic device. For example, the electronic device can store the sensitivity and offset in non-volatile memory that can be accessed when the device requests a IMU output. Process 1200 can end at step 1218.

Figure 13:
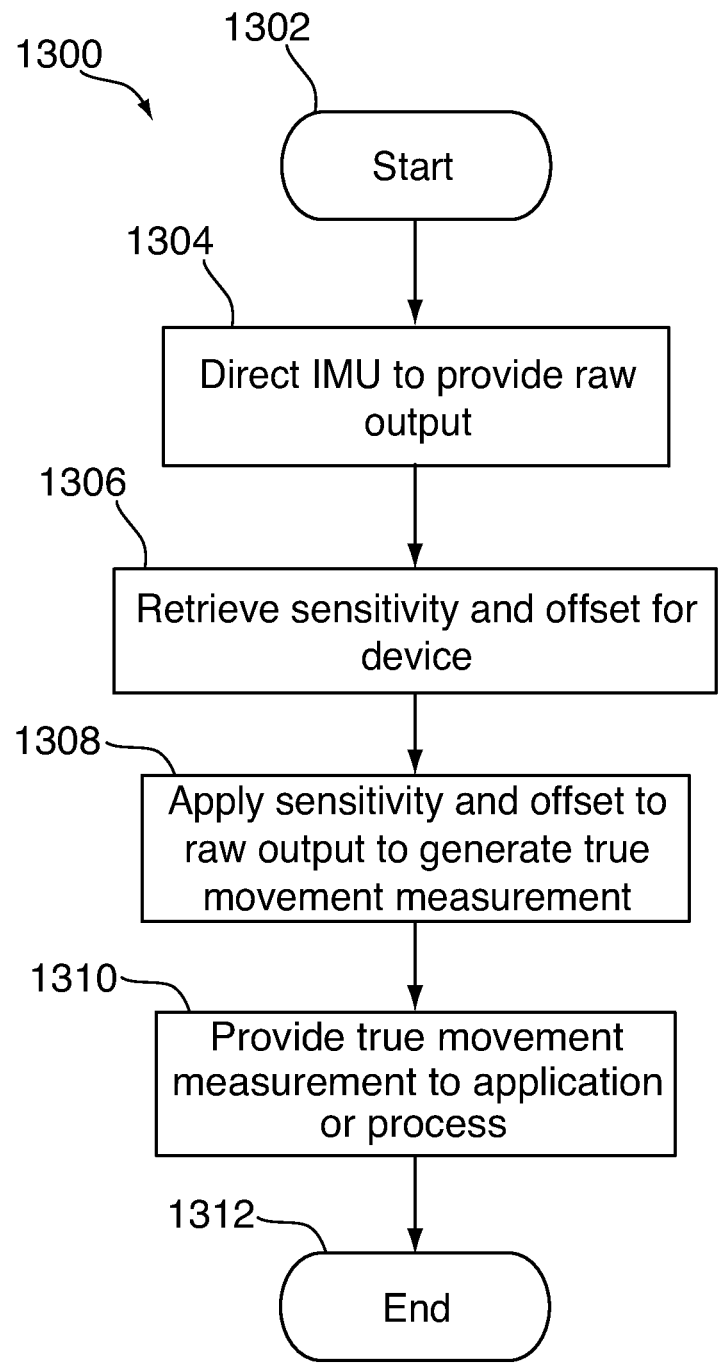
FIG. 13 is a flowchart of an illustrative process for adjusting an IMU output in accordance with one embodiment of the invention.

FIG. 13 is a flowchart of an illustrative process for adjusting an IMU output in accordance with one embodiment of the invention. Process 1300 can begin at step 1302. At step 1304, an electronic device can direct an IMU to provide a raw output. For example, the electronic device can operate an application that requires the use of an IMU (e.g., a gaming application). At step 1306, the electronic device can retrieve a sensitivity and offset associated with the device and IMU. For example, the electronic device can retrieve, from non-volatile memory (e.g., NAND), the stored sensitivity and offset that were stored during a calibration process. At step 1308, the electronic device can apply the retrieved sensitivity and offset to the raw output to generate a true movement measurement corresponding to the movement of the device in the device reference frame. For example, the electronic device can apply equation 400 (FIG. 4) to the raw output to calculate true movement information. At step 1310, the electronic device can provide the calculated true movement measurement to the device application. For example, the electronic device can provide the true movement measurement to a gaming application. Process 1300 can then end at step 1312.

The above described embodiments of the present invention are presented for purposes of illustration and not of limitation, and the present invention is limited only by the claims which follow.

What is claimed is:

1. A method for calibrating a fixture used to calibrate inertial measurement units (IMUs) of several electronic devices, comprising:
    placing a fixture in a gimbal operative to rotate between a plurality orientations;
    coupling a previously calibrated testing IMU to the fixture, wherein the testing IMU is aligned with a reference frame of the fixture;
    placing a previously calibrated mobile IMU incorporated in a housing in a particular slot of a plurality of slots in the fixture, wherein the mobile IMU is aligned with a reference frame of the housing;
    moving the gimbal in a sequence of testing orientations;
    capturing an output from the testing IMU and from the mobile IMU during the moving; and
    calculating a correction factor associated with the particular slot based on the captured output from the testing IMU and from the mobile IMU, wherein the correction factor is applied to convert the output of the mobile IMU to an output corresponding to the reference frame of the fixture.

2. The method of claim 1, further comprising:
    placing the mobile IMU in each slot of the plurality of slots; and
    calculating a correction factor for each slot of the plurality of slots.

3. The method of claim 1, further comprising:
    placing an electronic device having an IMU to calibrate in the particular slot;
    calculating a correction factor associated with the electronic device; and
    adding the correction factor associated with the particular slot to the correction factor associated with the electronic device.

4. The method of claim 1, wherein moving the gimbal further comprises:
    moving the gimbal in at least two sequences of testing orientations, wherein a first sequence is used to calculate the correction factor, and a second sequence is used to verify the correction factor.

5. The method of claim 4, wherein:
    the first sequence comprises at least four orientations; and
    the second sequence comprises at least one orientation.

6. The method of claim 4, wherein:
    the first sequence comprises six orientations; and
    the second sequence comprises three orientations.

7. The method of claim 1, wherein the housing comprises substantially the same size as an electronic device of the several electronic devices.

* * * * *

UNITED STATES PATENT AND TRADEMARK OFFICE
CERTIFICATE OF CORRECTION

| | | |
|---|---|---|
| PATENT NO. | : 8,583,392 B2 | Page 1 of 1 |
| APPLICATION NO. | : 12/794581 | |
| DATED | : November 12, 2013 | |
| INVENTOR(S) | : Peter Panagas | |

It is certified that error appears in the above-identified patent and that said Letters Patent is hereby corrected as shown below:

In The Specification

In Column 12, Line 4, delete "2 20 seconds)." and insert -- 2 seconds). --, therefor.

Signed and Sealed this
Twelfth Day of January, 2016

Michelle K. Lee
*Director of the United States Patent and Trademark Office*